US006844935B2

(12) United States Patent
Lee et al.

(10) Patent No.: US 6,844,935 B2
(45) Date of Patent: Jan. 18, 2005

(54) MULTI-FUNCTION OPTO-ELECTRONIC DETECTION APPARATUS

(75) Inventors: Chih-Kung Lee, Taipei (TW); Shuen-Chen Shiue, Keelung (TW); Shu-Sheng Lee, Taipei (TW); Jiun-Yan Wu, Taipei (TW); Chii-Wann Lin, Taipei (TW); Shiming Lin, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 10/761,116

(22) Filed: Jan. 20, 2004

(65) Prior Publication Data

US 2004/0145748 A1 Jul. 29, 2004

Related U.S. Application Data

(63) Continuation of application No. 09/928,177, filed on Aug. 10, 2001, now abandoned.

(51) Int. Cl.[7] .............................................. G01B 9/02
(52) U.S. Cl. ..................................................... 356/491
(58) Field of Search ................................ 356/489, 491, 356/493, 495, 519

(56) References Cited

U.S. PATENT DOCUMENTS

| 5,929,994 | A | * | 7/1999 | Lee et al. ................. 356/364 |
| 5,973,778 | A | * | 10/1999 | Hunt ........................ 356/300 |
| 6,483,584 | B1 | * | 11/2002 | Lee et al. ................. 356/369 |
| 6,590,667 | B1 | * | 7/2003 | Lee et al. ................. 356/507 |

* cited by examiner

Primary Examiner—Gregory J. Toatley, Jr.
Assistant Examiner—Michael A. Lyons
(74) Attorney, Agent, or Firm—J. C. Patents (57) ABSTRACT

A multi-function opto-electronic detection apparatus for detecting molecular characteristics of a test sample. The appratuses comprises functional mode subsystems including a detecting light source subsystem for generating sampling beams for illuminating the test sample; a manipulation optics subsystem for aligning the sampling beam onto the test sample; a target signal processing subsystem for analyzing target beams emerging from the test sample resulting from the illuminating of the sampling beam; and a sample fixation subsystem for holding the test sample. The detecting light source subsystem, manipulation optics subsystem and target signal processing subsystem are assembled into one of several possible optical sampling setups for the detection characteristics of the test sample. The functional mode setups include at least ellispometer, confocal image scanner, photon tunneling scanning microscope and interferometer.

20 Claims, 11 Drawing Sheets

MULTI-FUNCTION OPTO-ELECTRONIC DETECTION APPARATUS

CROSS REFERENCE

The present application is a continuation of application Ser. No. 09/928,177 filed Aug. 10, 2001 now abandoned, entitled "Multifunctional opto-electronic biochip detection system".

BACKGROUND OF THE INVENTION

1. Field of the Invention

The present invention relates in general to opto-electronic detection of molecular substances and, in particular, to a multi-function opto-electronic detection apparatus configurable into different modes for the detection of molecular substances.

2. Description of the Related Art

Fundamental theories for molecular detection are advancing continuously, especially in recent years. B. Liedberg et al. in 1983, for example, introduced a detecting system based on surface plasmon resonance effect. Resolution of detection achieved was up to the level of ng/ml. H Yang et al. in 1994 reported a technology based on electrochemistry fluorescent detection which achieved resolutions in the range from 10 pg to 5 ng per ml. Brain Trotter et al. published an article in Optical Engineering, May 1999 disclosing a technology for optical immunosensor assay detection based on fixed-polarizer ellipsometry. The technology demonstrated a precision better than 4 pg/ml. It led to practical utilization of the fixed-polarizer ellipsometry technology in biochemical applications.

Biomedical detection is involved with both the quantitative and the qualitative observation. Three-dimensional imagery are becoming ever more essential. Most of the popular and future detection systems rely on optical microscopy, which has insufficient resolution based on conventional technology. Utilization of scanning electron microscope (SEM) and atomic force microscope (AFM) leads to damage to assay samples, and some of these scanning need to have pre-processing or the detection operation may have to be conducted in a vacuum. More, conventional opto-electronic detection systems are limited to single-incident angle measurements. Conventional biomedical or chemical sensors are limited in detection flexibility. Further, dedicated detection system is required for detected detection.

SUMMARY OF THE INVENTION

The present invention provides a multi-function opto-electronic detection apparatus for detecting molecular characteristics of a test sample. The appratuses comprises functional mode subsystems including a detecting light source subsystem for generating sampling beams for illuminating the test sample; a manipulation optics subsystem for aligning the sampling beam onto the test sample; a target signal processing subsystem for analyzing target beams emerging from the test sample resulting from the illuminating of the sampling beam; and a sample fixation subsystem for holding the test sample. The detecting light source subsystem, manipulation optics subsystem and target signal processing subsystem are assembled into one of several possible optical sampling setups for the detection characteristics of the test sample. The functional mode setups include at least ellispometer, confocal image scanner, photon tunneling scanning microscope and interferometer.

DETAILED DESCRIPTION OF THE PREFERRED EMBODIMENTS

In accordance with a preferred embodiment of the present invention, an inventive multi-function opto-electronic detection apparatus can be used to allow for the implementation of different biomedical and/or molecular detection on a common platform. An inventive detection apparatus of the present invention is an apparatus comprising functional modules to be organized in different setup configurations for the implementation of the desired detection operations. In a preferred embodiment of the inventive multi-function opto-electronic detection apparatus, at least four different types of advanced and precision opto-electronic detection operations can be implemented on an integrated common platform. These include detection operations based on the theories of ellipsometry, confocal scanning, evanescence waves, and interferometry.

For a detection apparatus to implement these testing operations in accordance with the teaching of the present invention, at least four functional component groups must be present. A detecting light source group needs to provide the "illumination lighting" that is to be directed onto the examined target. A manipulation optics group aligns the detecting light beam(s) onto the target. A target signal processing group analyzes the optical signal obtained from the target. And, a fixation group is used to hold the test sample in a fixed and precise manner.

Figure 1:
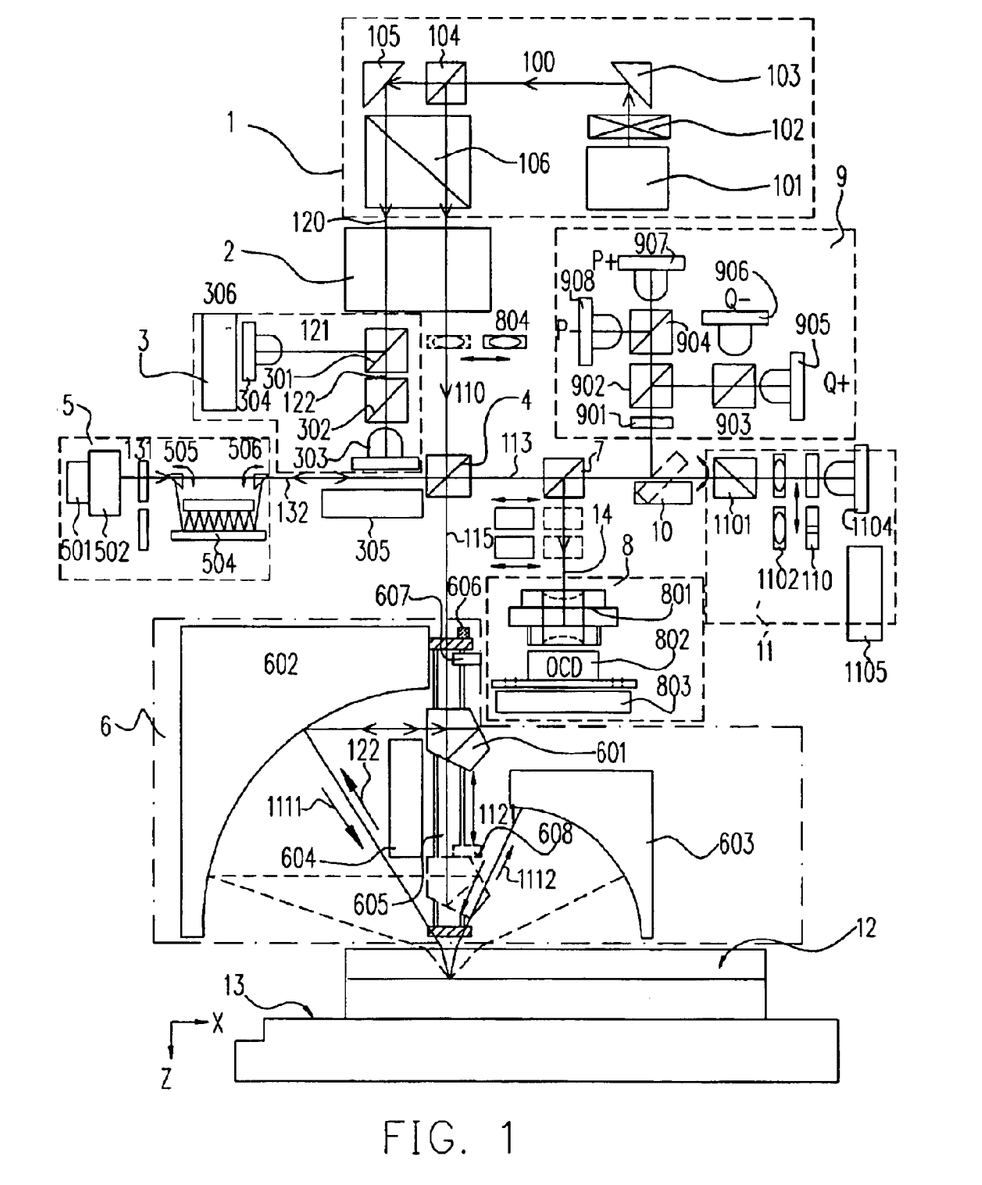
FIG. 1 schematically illustrates the layout of a multi-function opto-electronic detection apparatus in accordance with a preferred embodiment of the present invention.
Figure 2:
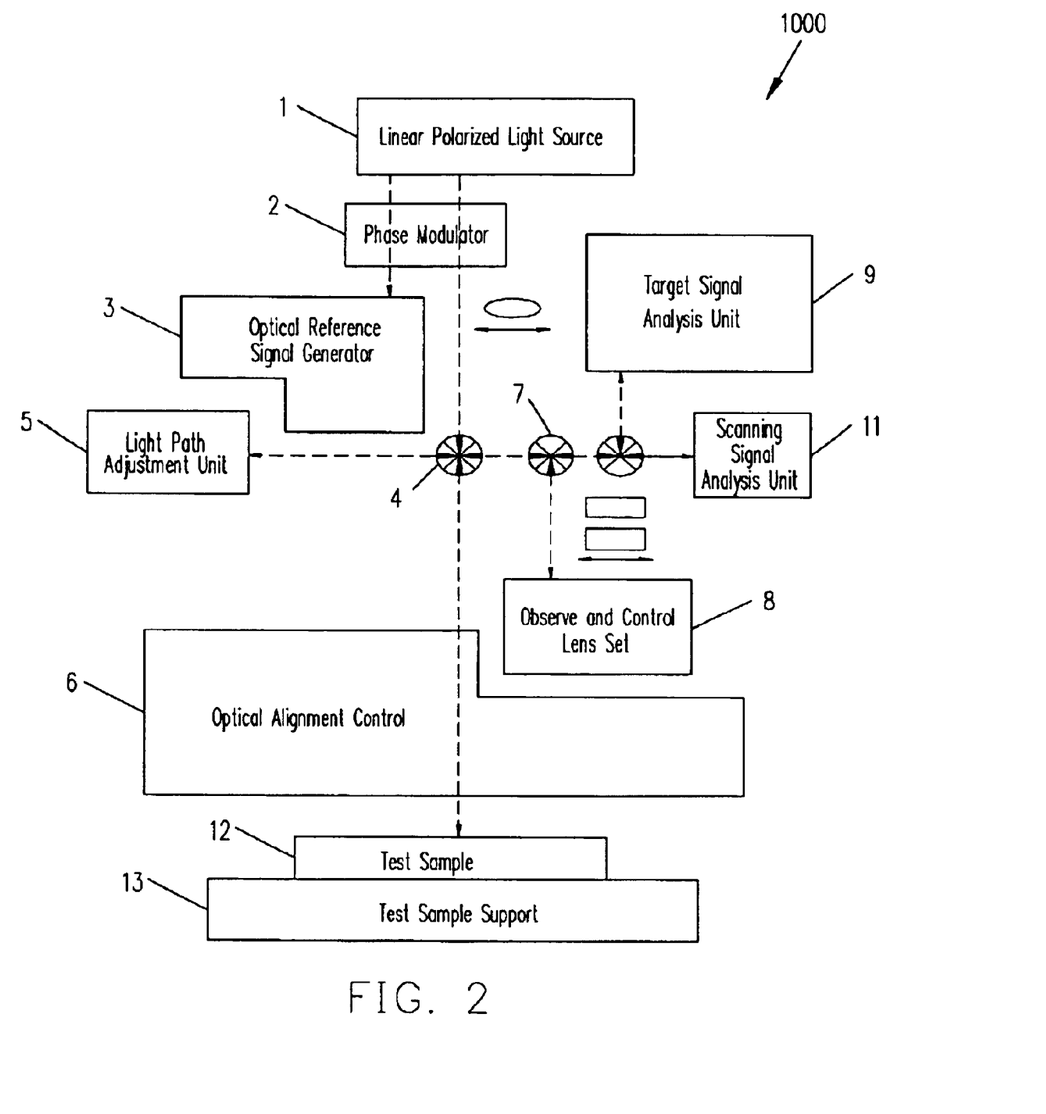
FIG. 2 is a block diagram showing the overall system configuration of the multi-function opto-electronic detection apparatus of FIG. 1 in terms of functional blocks.

FIG. 1 schematically illustrates the layout of such a multi-function opto-electronic detection apparatus in accordance with a preferred embodiment of the present invention, and the block diagram of FIG. 2 shows, in terms of functional blocks, the overall system configuration of the system of FIG. 1. With simultaneous reference to both drawings, a preferred detection apparatus 1000, as illustrated, is complete with all four functional component groups described above. They include a linear polarized light source 1, a phase modulator 2, an optical reference signal generator 3, and a light path adjustment unit 5 for the detecting light source group. An optical alignment control 6 and an observe and control lens set 8 are installed for the manipulation optics group. An interferometric optical signal analysis unit 9 and a scanning signal analysis unit 11 are used for the target signal processing group. The fixation group, on the other hand, is responsible for holding the sample utilizing a test sample support 13.

Each of these modular components for the functional component groups is selectively organized in a functional setup. In other words, some or all of the group components are shared among different setups of the inventive detection apparatus. As is shown in the drawings, optical paths (represented by dotted arrowhead lines) of the illumination light beams and the target-reflected signals are also shared among the detection modes.

For the detecting light source group, as is exemplified in FIG. 1, a typical light source 1 for the detection apparatus 1000 has a laser 101 for directing a detecting light beam 100 onto a non-polarizing beam-splitter 104 and also onto the reflector 105. With the use of a linear polarizer 106, the pair of parallel polarized laser light beams 110 and 120 can be generated for passing on to the phase modulation unit 2.

Phase modulation unit 2 modulates the phase of the polarization state of the polarized light supplied by the light source 1. Preferably, phase modulation unit 2 may comprise a compensator, an optical modulator of the liquid crystal or other type, each suitable for providing a desired polarization state.

Optical reference signal generator 3 comprises an unpolarized light beam splitter 301, an analysis plate 306 and two photodetectors 303 and 304. Photodetectors can be constructed using photodiodes or linear CCD array. Light path adjustment unit 5 is used for the adjustment of detecting illumination light beam whenever necessary.

For the manipulation optics group, optical alignment control 6 comprises a concave quasi-paraboloidal reflective mirror 602, a quasi-spherical reflective mirror 603, and a uniaxial displacement stage 605 controlled in a feedback loop and carrying a prism set that may include a penta or triangular prism 601. Optical alignment control 6 is used to implement adjustment to the incident angle of detecting illumination light beam directed onto the sample-bearing biochip. Observe and control lens set 8 comprises various micro-optic lenses. For example, an image-grabbing device such as camera 803 may have a high power lens set and a CCD array for monitoring the reaction of bio-molecules on the surface.

For the target signal processing group, a target signal analysis unit 9 and a scanning signal analysis unit 11 can both be utilized to analyze the optical signal obtained from the target.

For the fixation group, a test sample support 13 is used to hold the test sample in a fixed and precise manner. Whenever necessary, the entire support 13 as a platform can be moved under precision control in a coordinate system.

Figure 3:
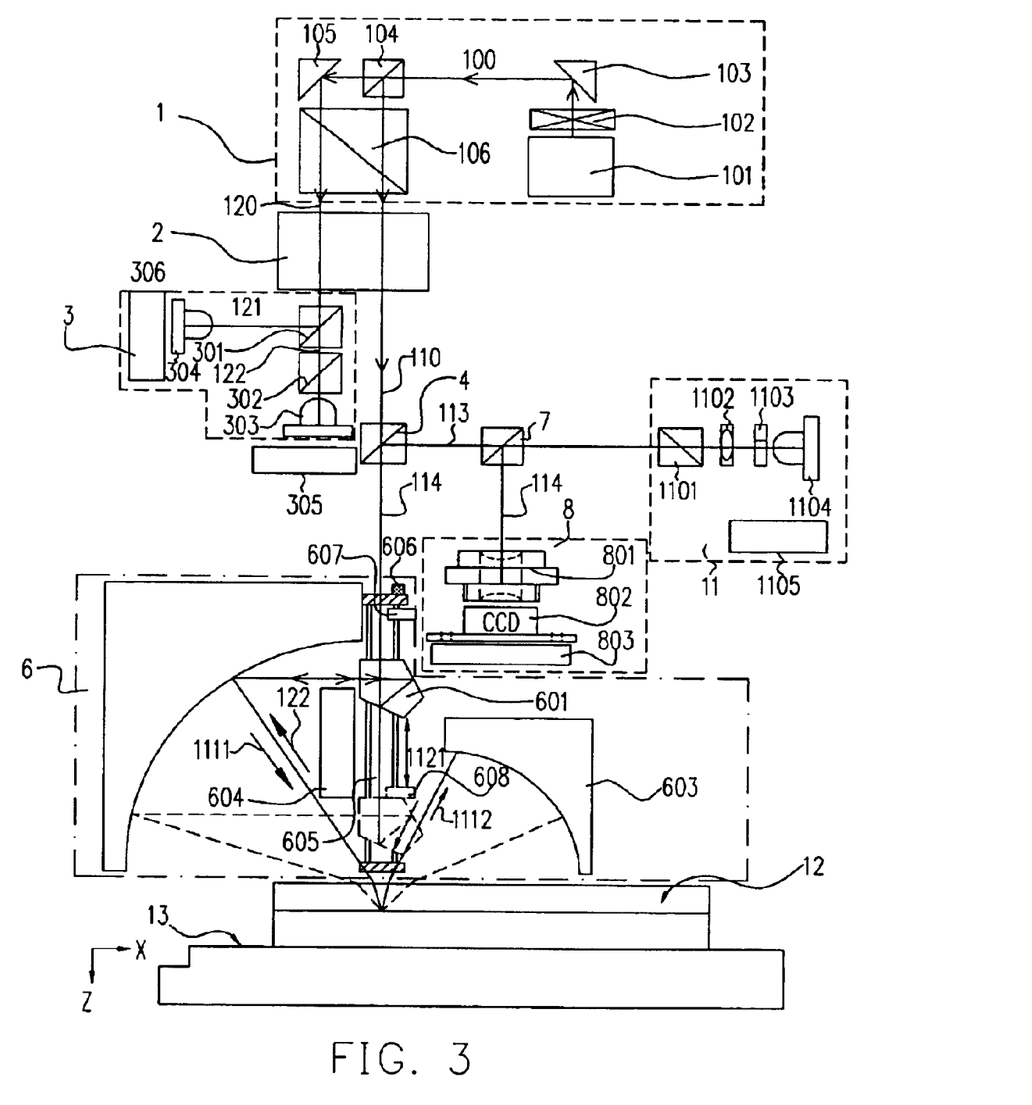
FIG. 3 schematically illustrates the system of FIG. 1 set up into a functional configuration for implementing phase modulation ellipsometry polarization examination.

FIG. 3 schematically illustrates the system of FIG. 1 set up into a functional configuration for implementing phase modulation ellipsometry polarization examination. For this functional setup, linear polarized light source 1, phase modulator 2 and optical reference signal generator 3 are included in the detecting light source group, optical alignment control 6 and observe/control lens set 8 are in manipulation optics group, and scanning signal analysis unit 11 is in target signal processing group.

To implement ellipsometric detection examination on the system of FIG. 3, a pair of laser light beams along paths 110 and 120 is produced by the linear polarized light source 1. In the typical light source 1 depicted herein, beam on path 110 serves as the sampling beam and that on path 120 as the reference beam.

Reference beam on path 120 is passed through phase modulator 2 and onto optical reference signal generator 3 to round up the reference light path. Sampling beam on path 110, on the other hand, is passed straight through phase modulator 2 and directed toward optical alignment control 6. The sampling beam then illuminates the examined sample 12 in the form of, for example, a biochip to facilitate target sampling.

Sampling beam travels back and forth along the same route of path 110. At the non-polarizing beam-splitter 4, split sampling beam is directed toward another non-polarizing beam-splitter 7 and split further into two beams along paths 113 and 114 respectively. Beam on path 113 is directed to the scanning signal analysis unit 11, where the sampling light beam passes through analyzer 1101 and reaches to photodetector 1104. Beam on path 114 becomes the observer beam and is received by the lens set 8.

The detection apparatus set up in FIG. 3 and functioning as a phase modulation ellipsometer is under programmed control for the separate processing of captured signals. Main control program of the detection apparatus also determines and controls the incident angle at the optical alignment control 6 and calculates the refractive index of the examined sample. Light intensity and polarization state of the reference beam are used as references for comparison with those of the sampling beam.

In the reference signal generator 3, incoming reference beam along path 120 is divided by a beam-splitter 301 into two beams 121 and 122. Beam 121 is directed straightly into photodetector 304, and beam 122 into photodetector 303 after passing through analyzing plate 302. Detector readings are picked up and can be used for the control of the liquid crystal in a feedback loop. Readings also provide for analysis for resolving into detection results.

Sampling beam along path 110 enters optical alignment control 6. In this embodiment, main control program of the system controls the uniaxial movement of the displacement stage 605 holding the penta prism 601, governed by a motion control card (MCC) 604 and limit switches 607 and 608. Back-and-forth movements along the Z-axis align the incident angle of the sampling beam.

Optical alignment control 6 is operated to ensure the correct alignment of the sampling beam, such as along the path 1111, onto a designated measuring point on the substrate of the sample biochip 12. Intensity of the light beam reflected depends on thickness and refractive index of the test sample on the biochip, namely, the size of the bio-molecules and the sample concentration. In this setup, beam on path 1112 reflected from sample 12 is incident on the concave quasi-spherical reflective mirror 603 at normal angle. Reflection by the concave quasi-spherical reflective mirror 603 along the same path 1112 returns back onto the biochip sample 12 at the same measuring point. Light intensity of the sampling beam directed onto the sample is thus doubled due to the presence of the concave mirrors. Sampling resolution is improved as a result.

Optical alignment control 6 of the ellipsometric detection setup provided by the inventive detection apparatus can send the detecting light beam back to the test sample along the same incoming light path to be received at the scanning signal analysis unit 11. Analysis unit 11 allows the detecting light beam to be passed over the tested sample twice, resulting in the improvement of precision and sensitivity for the ellipsometric measurement. Analysis unit 11 controls illumination of the detecting light beam directed onto the examined sample based on the needs of the different modes of operation. Incident angle of the detecting light beam can be controlled with much higher precision and flexibility than comparable conventional devices. Overall size of the ellipsometer is greatly reduced and can be conveniently applicable to various real-time biomedical detection.

In a preferred embodiment, observe and control lens set 8 has a lens assembly 801, a CCD array 802 and a framegrabbing card 803 assembled to function as a camera. Observe and control lens set 8, with its camera, allows the operator to oversee the detection operation of the entire detection apparatus and manipulates control such as adjustments of the measuring point on sample.

Figure 4:
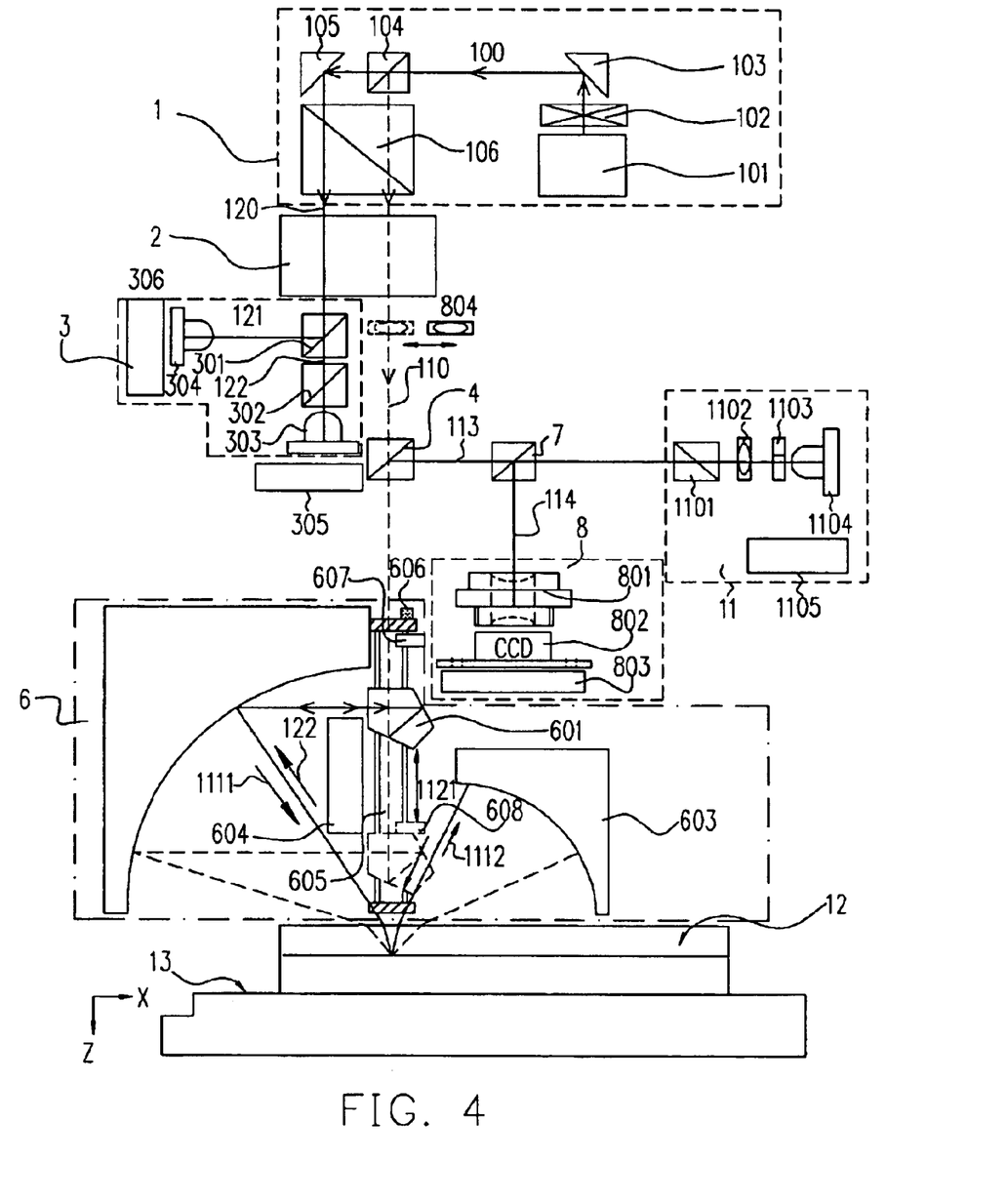
FIG. 4 schematically illustrates the system of FIG. 1 set up into a functional configuration for implementing confocal image scanning.

FIG. 4 schematically illustrates the system of FIG. 1 set up into a functional configuration for implementing confocal image scanning. For this functional setup, linear polarized light source 1, phase modulator 2 and optical reference signal generator 3 are included in the detecting light source group, optical alignment control 6 and observe/control lens set 8 are in manipulation optics group, and scanning signal analysis unit 11 is in target signal processing group.

Hardware configuration in this setup specifically for implementing confocal image scanning is similar to that described above in FIG. 3. However, in this particular functional setup, scanning signal analysis unit 11 has a beam expand/contract lens set 1102/1103 inserted along its beam path in front of the photodetector 1104. Focused beam is aligned and passed through a pinhole, forming a confocal microscope. Also, a contraction lens 804 is additionally inserted along the path 120 for the sampling beam immediately next to the phase modulator 2.

Hardware components selected from the functional groups of the basic system morphs the inventive multifunction opto-electronic detection apparatus into a confocal image scanning microscope. The resultant confocal microscope is different from its conventional counterparts. Due to the alignment control flexibility provided by the optical alignment control 6, sampling beam directed on the test sample biochip can have varied incident angles. Scanned sections in the sample is no longer fixed to perpendicular. 3-D images of the sample can be obtained with much improved precision and easy.

With the confocal microscope setup of FIG. 3, precision planar scanning of the sample is possible. Test sample support 13 of the fixation group, typically in the form of a precisely positioned platform, can be moved in the X-Y plane under system program control. As the Z axis movements are controlled in the process of sample cross-sectional scanning by the micro-displacement stage of the platform, 3-D scanning can be implemented.

The detection apparatus of FIG. 4, a confocal microscope for implementing surface plasmon resonance (SPR) detection is based on total reflection evanescent wave excitation in accordance with the evanescent wave theory. In the system of FIG. 4, sampling beam can be adjusted into a p wave employing polarization adjustment. With incident angle alignment control performed by the optical alignment control 6, sampling beam may achieve angle modulation. This results into two different functional setups for amplitude SPR detection. If a beam expander is used to expand the sampling area, the system becomes a photon tunneling microscope (PTM). All these setups are based on the theories of evanescent waves, as will be described below.

Figure 5:
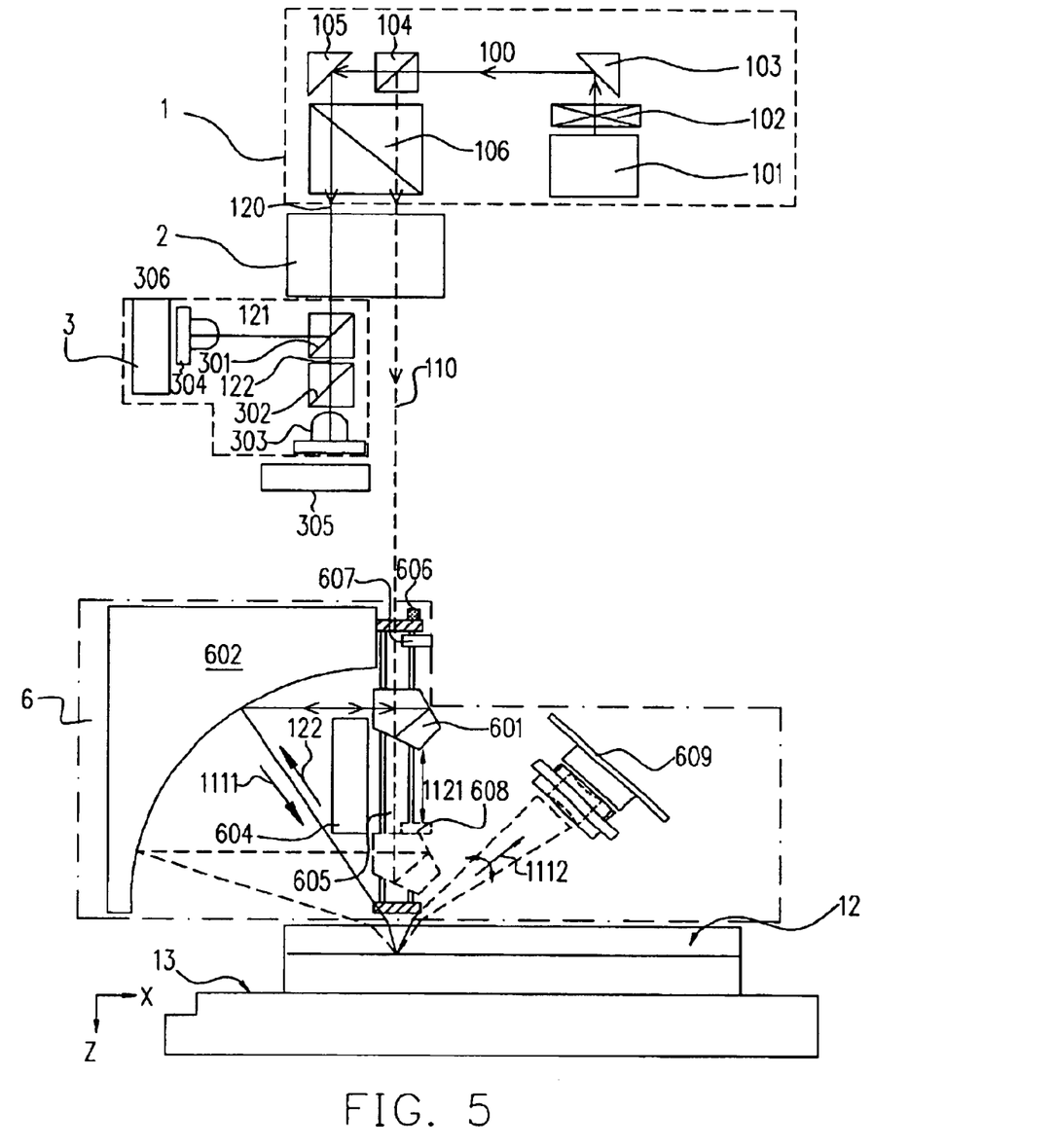
FIG. 5 schematically illustrates the system of FIG. 1 set up into another functional configuration for implementing confocal image scanning.

FIG. 5 schematically illustrates the system of FIG. 1 set up into another functional configuration for implementing confocal image scanning based on the amplitude surface plasmon resonance detection technology. For this functional setup, linear polarized light source 1, phase modulator 2 and optical reference signal generator 3 are included in the detecting light source group, and optical alignment control 6 and observe/control lens set 8 are in manipulation optics group.

Hardware configuration in this setup specifically for implementing amplitude SPR detection using a confocal microscope altered from that described above in FIG. 3 also for confocal microscopy. Specifically, for target signal reception, the system has a photodetector 609 and the quasi-spherical reflective mirror 603 of the optical alignment control 6 is removed. Reflected beam on path 1112 is aligned into the planar light intensity photodetector 609, which can be used to pick up signal from multiple measuring points as the alignment control scheme is performed by the control unit 6 with varying surface plasmon resonance angles.

Figure 6:
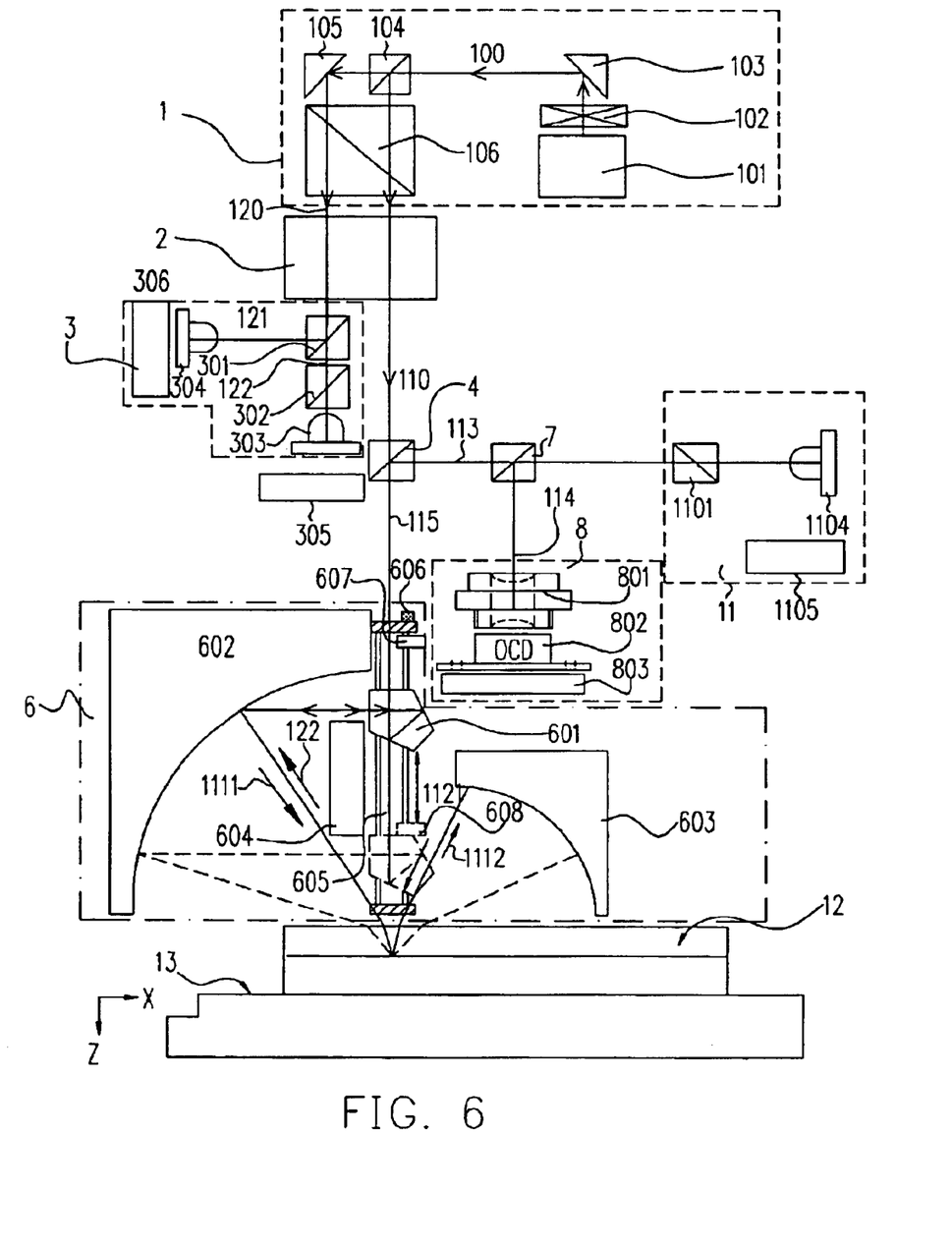
FIG. 6 schematically illustrates the system of FIG. 1 set up into yet another functional configuration for implementing confocal image scanning.

FIG. 6 schematically illustrates the system of FIG. 1 set up into yet another functional configuration for implementing confocal image scanning also based on the amplitude surface plasmon resonance detection technology. For this functional setup, linear polarized light source 1, phase modulator 2 and optical reference signal generator 3 are included in the detecting light source group, optical alignment control 6 and observe/control lens set 8 are in manipulation optics group, and scanning signal analysis unit 11 is in target signal processing group.

Hardware configuration in this setup specifically for implementing confocal image scanning is similar to that described above in FIG. 3, without a beam expand/contract lens set inserted along its beam path in front of the photodetector 1104. Sampling beam passed on over path 113 is directed pass the analyzer 1101 and to the photodetector 1104. Another beam 114 is directed into the observe/control lens set 8.

Figure 7:
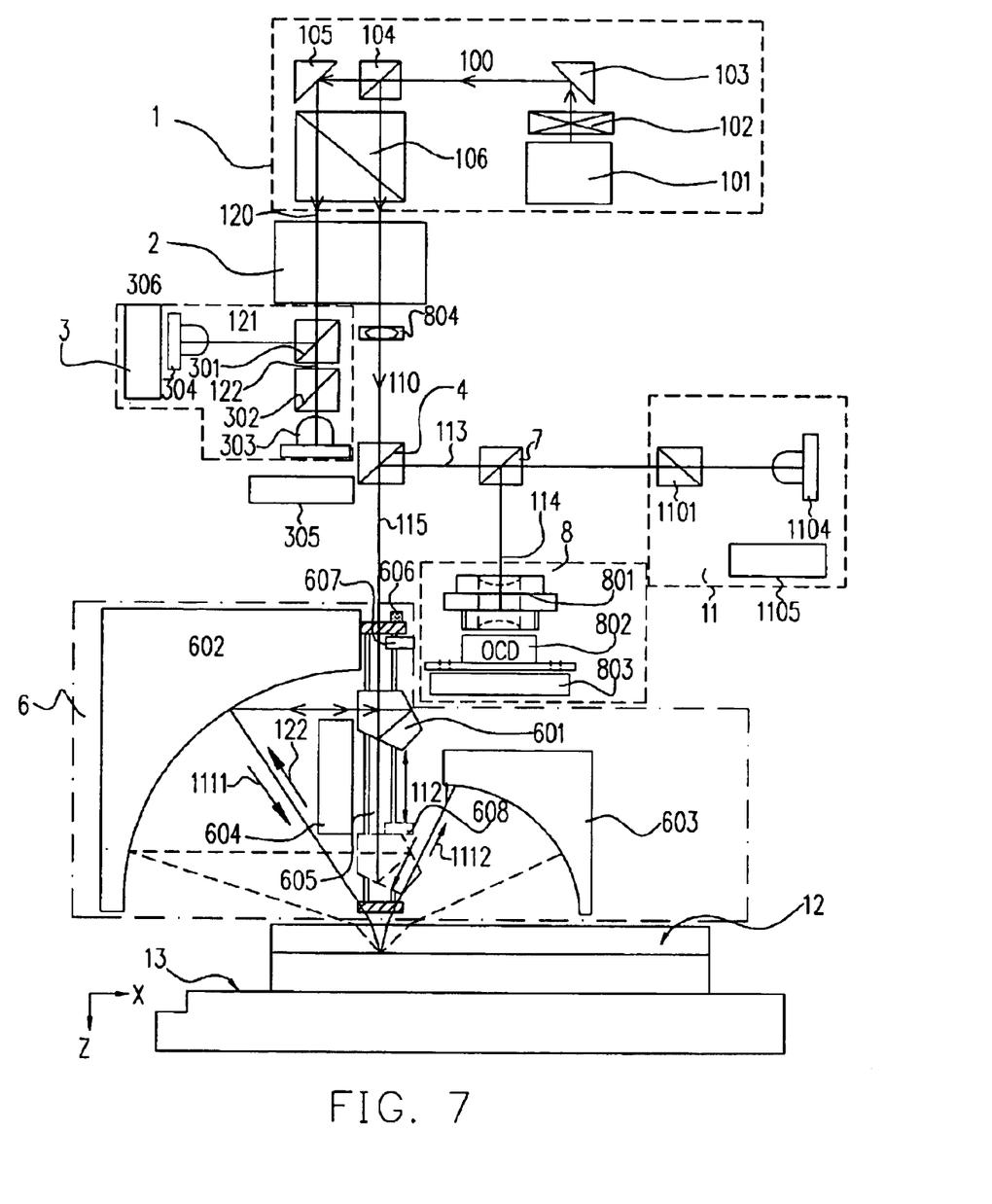
FIG. 7 schematically illustrates the system of FIG. 1 set up into a functional configuration for implementing photon tunneling scanning microscopy operation.

FIG. 7 schematically illustrates the system of FIG. 1 set up into a functional configuration for implementing photon tunneling scanning microscopy operations based on the theories of evanescent waves. For this functional setup, linear polarized light source 1, phase modulator 2 and optical reference signal generator 3 are included in the detecting light source group, optical alignment control 6 and observe/control lens set 8 are in manipulation optics group, and scanning signal analysis unit 11 is in target signal processing group.

Hardware configuration in this setup specifically for implementing photon tunneling scanning microscopy is similar to that described above in FIG. 6, with the contraction lens 804 inserted along the path 120 for the sampling beam immediately next to the phase modulator 2. This particular setup embodies a photon tunneling microscope detection apparatus.

Sampling beam reflected on the path 1112 is picked up by a planar light microscope 609, which has lenses and sensor electronics to function as a camera. It can be employed to observe and make adjustments to measuring points on the sample biochip. Based on the collected image information, configuration of bio-molecules on the biochip can be outlined. Static measurements performed over the entire detection area revealing details of the relationships between molecules of the protein on the chip, antibody and antigen can also be used for automatic collimating of the sampling beam 110.

Figure 9:
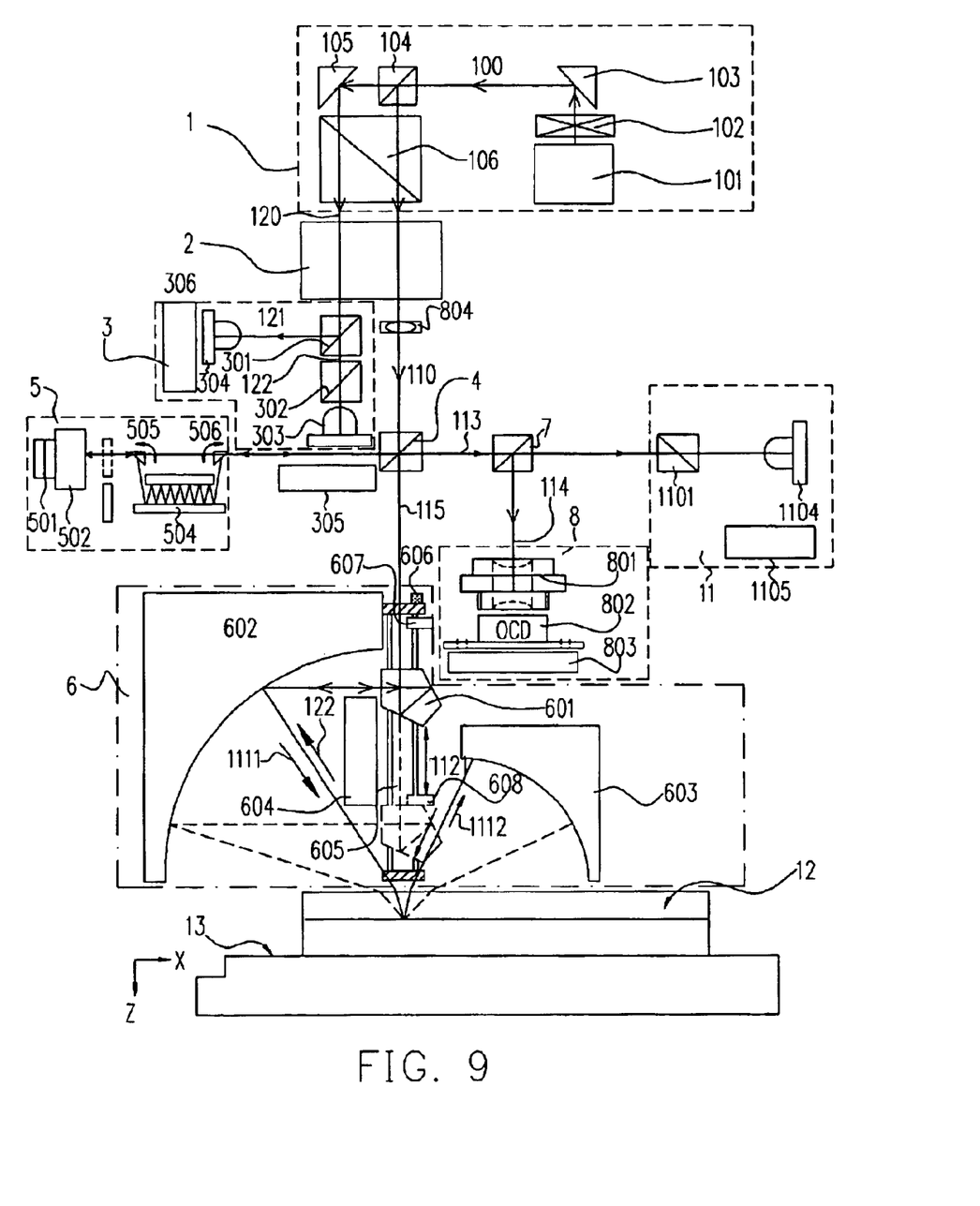
FIG. 9 schematically illustrates the system of FIG. 1 set up into a functional configuration for implementing optical coherence tomographic examination.
Figure 10:
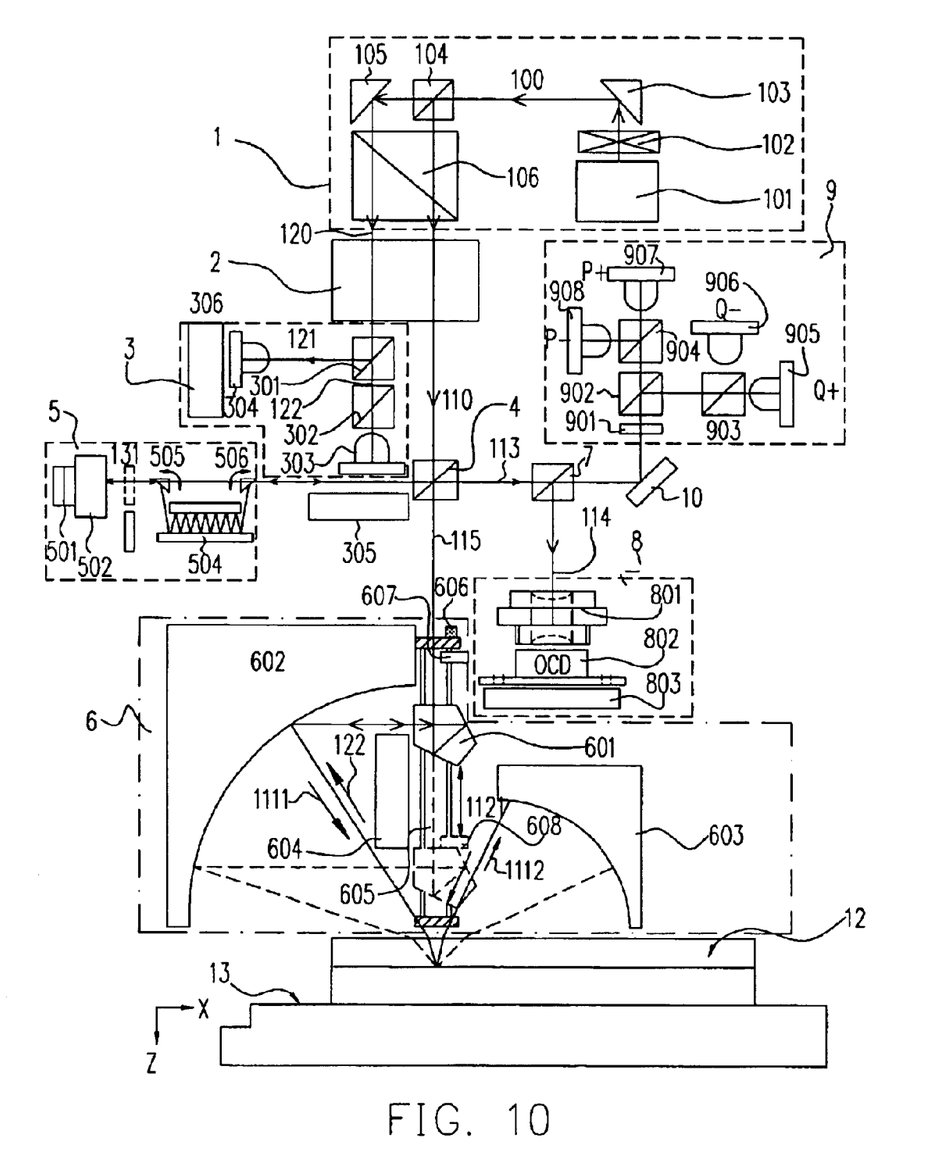
FIG. 10 schematically illustrates the system of FIG. 1 set up into a functional configuration for implementing Doppler laser interferometry examination.

Other functional setups achievable utilizing the inventive multi-function opto-electronic detection apparatus involves an integration with a conventional Michaelson interferometer. In a preferred embodiment, the particular setup includes the use of an integrated optical interferometer. Such integration results in various advantageous features for the usefulness of the inventive detection apparatus. The setup in FIG. 8 exemplifies the set up of the system as an optical interferometer. FIG. 9 embodies another functional mode of the inventive system capable of implementing optical coherence tomography. FIG. 10 demonstrates how a laser Doppler vibrometer/interferometer can be configured using the inventive detection apparatus.

All these interferometric setups had been demonstrated to achieve high resolution in obtaining cross-sectional views as well as dynamic measurements. These functional modes provided by the inventive system are well suited for use in the study of biology, medicine and chemical reaction etc., in particular, the functional modes are compatible both with the ELISA and BIA formats. All these functional modes are easily implemented with the switching of a couple of hardware components equipped to the inventive detection apparatus.

The detection apparatus set up to function as a photon tunneling scanning microscope can detect evanescent wave energy dissipation arising from the total reflection by the target surface irradiated by an illumination wave. Energy dissipation emerging from the examined target picked up by the inventive detection apparatus can be converted into a representation of the target surface characteristics based on the known relationship, namely, intensity of the energy dissipation is directly related to the distance between the test body and the reflection surface. Precision of measurement along the height orientation up to the level of $10^{-10}$ is achievable.

Figure 8:
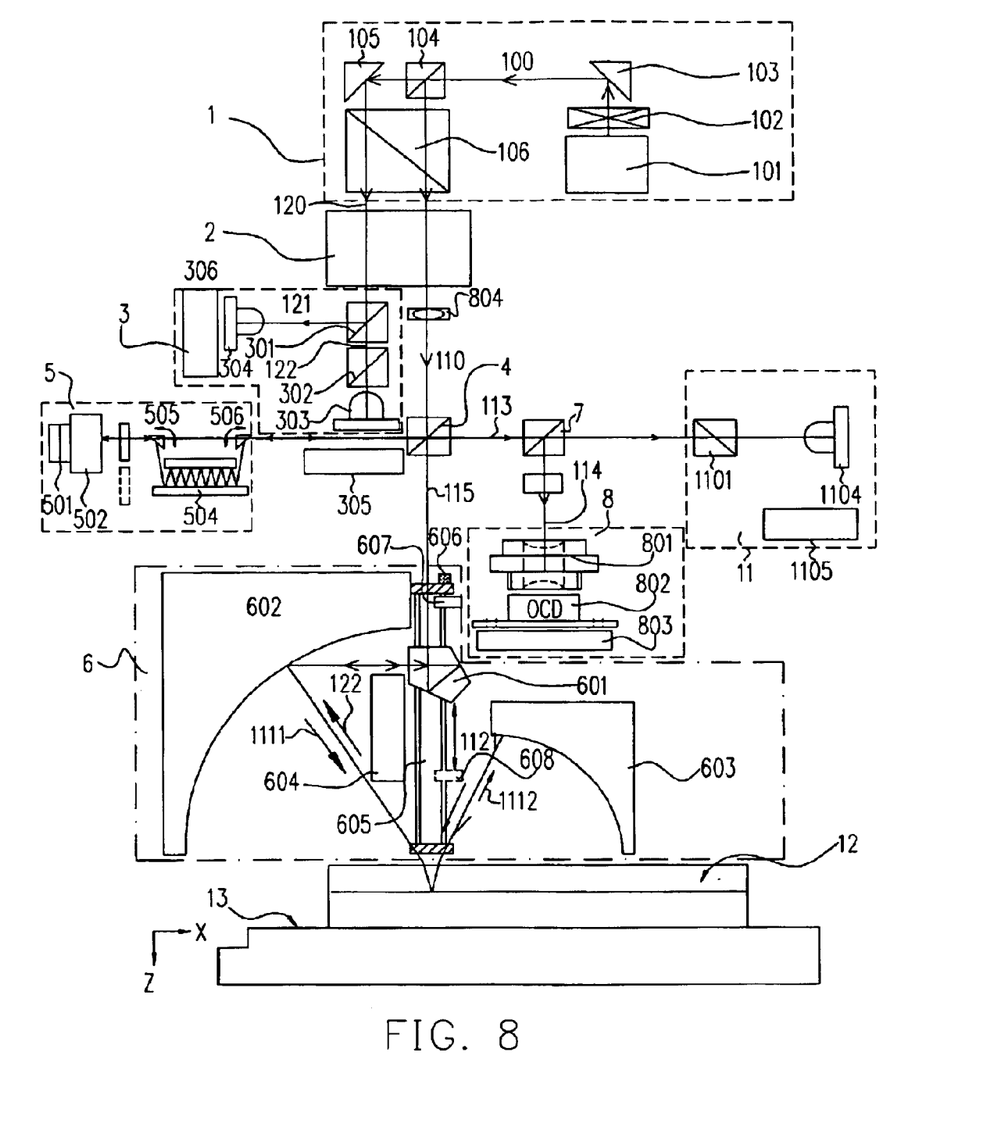
FIG. 8 schematically illustrates the system of FIG. 1 set up into a functional configuration for implementing phase interferometry examination.

FIG. 8 schematically illustrates the system of FIG. 1 set up into a functional configuration for implementing phase interferometry examination. For this functional setup, linear polarized light source 1, phase modulator 2, optical reference signal generator 3 and light path adjustment unit 5 are included in the detecting light source group, optical alignment control 6 and observe/control lens set 8 are in manipulation optics group, and scanning signal analysis unit 11 is in target signal processing group.

Hardware configuration in this setup specifically for implementing phase interferometry has the contraction lens 804 switched in and the beam expand/contract lens set 1102/1103 of the scanning signal analysis unit 11 switched out from the system configuration. In the particular setup of FIG. 8, beam along path 111 serves as sampling light to measure the surface configuration. Beam along path 131, on the other hand, is provided as an interference beam for the measurement of phase variations.

Using, for example, a Febry-Perot device, beam on path 131 can be adjusted to have the same total light path as that of the on path 112. This allows the interference between beams of the transmitting and reflecting components after beams on paths 132 and 112 travel through the non-polarizing beam-splitter 4. The interference beam is further divided into two beams on 113 and 114 by the non-polarizing beam-splitter 7. Beam on 113 propagates to the photodetector 1104 through the analyzer 1101, and beam on 114, serving as an observation beam, propagates to the observe and control lens set 8.

In order to utilize the feedback control system for the control of the liquid crystal phase modulator 2, main control program is required to send a timely square wave to the LC modulator 2 to facilitate controlled phase delay. However, since liquid crystal plate is used as the phase modulator, a birefringence phenomenon arises with the application of the LC driving voltage. As a result, the phase delay angle is nonlinear with respect to the intensity of the transmitting light. The absorption property is also nonuniform. This is why it is necessary for the single beam 100 to be divided into a reference beam on 104 and a sampling beam on 105. Referencing and sampling beams are directed pass the linear polarizer and liquid crystal phase modulator 2 subsequently, and the resultant intensity and polarization state of the reference beam on 120 are used as reference for the sampling beam.

In the optical alignment control 6, beam on path 1121 travels back along the original path 1112 of the sampling beam and reaches to the substrate of the sample biochip. Reflection occurs at the detecting point of the sample, and phase of the reflected beam on 1122 is changed two times. Phase change thus achieved is dependent on the surface configuration of bio-molecules of the test sample on the biochip. The inventive detection apparatus operating in the phase interferometric mode is able to achieve higher resolution than conventional comparable interferometers.

The interference microscopy configuration is capable of direct measurement of the surface topology of biochips. This is equivalent to the interference microscopy used in semiconductor fabrication. Necessary parameters for the design of a biochip can enjoy total control under the detection apparatus of the present invention.

FIG. 9 schematically illustrates the system of FIG. 1 set up into a functional configuration for implementing optical coherence tomographic examination. For this functional setup, linear polarized light source 1, phase modulator 2, optical reference signal generator 3 and light path adjustment unit 5 are included in the detecting light source group, optical alignment control 6 and observe/control lens set 8 are in manipulation optics group, and scanning signal analysis unit 11 is in target signal processing group.

Hardware configuration in this setup specifically for implementing phase interferometry has the contraction lens 804 switched in and the beam expand/contract lens set 1102/1103 of the scanning signal analysis unit 11 switched out from the system configuration. In the particular setup of FIG. 9, beam along path 111 serves as sampling light to measure the surface configuration. Beam along path 131, on the other hand, is provided as an interference beam for the measurement of phase variations.

In the light path adjustment unit 5, a five-step phase shifting scheme is used to implement optical interference. Phase change in the reflection beam on path 1122 is to be determined. Under the above-described reflection conditions, voltage control driver 501 of unit 5 changes the light path of beam on 132. Beams on 132 and 112 interfere with each other and five different phases are produced. The DCT reconstruction method is employed to calculate the phase changes of the beam on 112.

FIG. 10 schematically illustrates the system of FIG. 1 set up into a functional configuration for implementing Doppler laser vibrometer/interferometer examination. For this functional setup, linear polarized light source 1, phase modulator 2, optical reference signal generator 3 and light path adjustment unit 5 are included in the detecting light source group, optical alignment control 6 and observe/control lens set 8 are in manipulation optics group, and target signal analysis unit 9 is in target signal processing group. Hardware configuration in this setup specifically for implementing Doppler phase interferometry has the contraction lens 804 switched out from the system configuration.

In the light path adjustment unit 5, reference beam on path 131 is directed to the Febry-Perot reflection cavity 504 and then reaches the reflective mirror 502. On reflection, the beam travels through the Febry-Perot reflection cavity 504 again and leaves the unit 5. Reflection cavity 504 can be used to control the path length of the reference beam on 130 to be equal to that of the measuring beam on 110. Cavity 504 further controls the location of the interference pattern points, which should be at desired locations with respect to the sectional area of the tested sample. Beam on 131 travels across the reflection cavity 504, the ¼ wave plate, and the reflective mirror successively under control and then reflected as beam on 132.

Reflection cavity 504 also maintains equal path lengths for beams on 131 and 132. As a result, reference beam on 132 and measuring beam on 112 can travel back to the non-polarizing beam-splitter 4 with equal total path lengths before mutual interference. This resolves the issue of the coherence length of laser beams. Beams on 131 and 132 pass through the ¼ wave plate twice, resulting in a polarization state with 90° phase difference relative to that of the measuring beam on 110.

After double reflections, beams on 112 and 131 meet at the beam-splitter 4 and cause interference. Through beamsplitter 7, the merged beam is split into a signal beam on 113 and an observing beam on 114. Signal beam on 113 is directed to the target signal analysis unit 9 by the rotating reflective mirror 10. Observing beam on 114, on the other hand, propagates to the observe and control lens set 8. Returning to the beam-splitter 4, which splits the beam into two on 131 and 132, phase difference can be calculated based on the Jones rule. The phase difference does not vary with time.

In the target signal analysis unit 9, axis of the ¼ wave plate 901 is aligned to the direction having a 45° polarization with respect to the beam on 115. As a result, a right-handed circular-polarized beam and a left-handed circular-polarized beam are produced after the beam 115 passes through the ¼ wave plate. Since the two beams are four times the Doppler frequency ($4f_d$) due to circular rotation, a circular-polarized beam with circular frequency is produced after interference, in which the low frequency carries the high frequency. The low frequency is $2f_d$ and the high frequency is 2 ($f-f_d$). The interference beam is produced after traveling through the ¼ wave plate 901, and the non-polarizing beam-splitter 4 splits the beam into two polarizing beams P and Q with equal light intensity. Beam P passes through a polarizer with 45° polarization. Beam Q, on the other hand, is passed through a polarizer with the polarization direction aligned with the X-axis.

Each of beams P and Q is detected by its respective photodetector for light intensity. Due to frequency limitations, light intensities detected by photodetectors vary along with the low frequency of $4f_d$. After being converted into voltage and amplified, a signal representative of the normal shift in phase between the two beams can be obtained. The phase difference representative signal is a sine/cosine signal. The detected signal can then be displayed as a Lissajous circle, which can be used for bi-pase identification. This solves the directional ambiguity in the interferometer so that moving direction of the tested sample can be determined.

In this particular functional setup, the detection apparatus of the present invention may be equipped with a PQ signal detection unit associated with an ultrasonic device for the excitation of the bio-molecules on the biochip within an entire bandwidth. From dynamic frequency response of the bio-molecule transformation function for the signal detection and the input signal source, recombination characteristics between the molecules can be observed clearly. Since weight of bio-molecules is small and the frequency involved is high, a Doppler vibrometer or interferometer incorporated with an ultrasonic exciter becomes a very useful tool in the study of biology, medicine and chemical reaction.

Still another functional setup is possible for the inventive multi-function opto-electronic detection apparatus by integration of interferometry and surface plasmon resonance phase difference. The setup in FIG. 11 exemplifies such a functional mode setup of the inventive detection apparatus.

Figure 11:
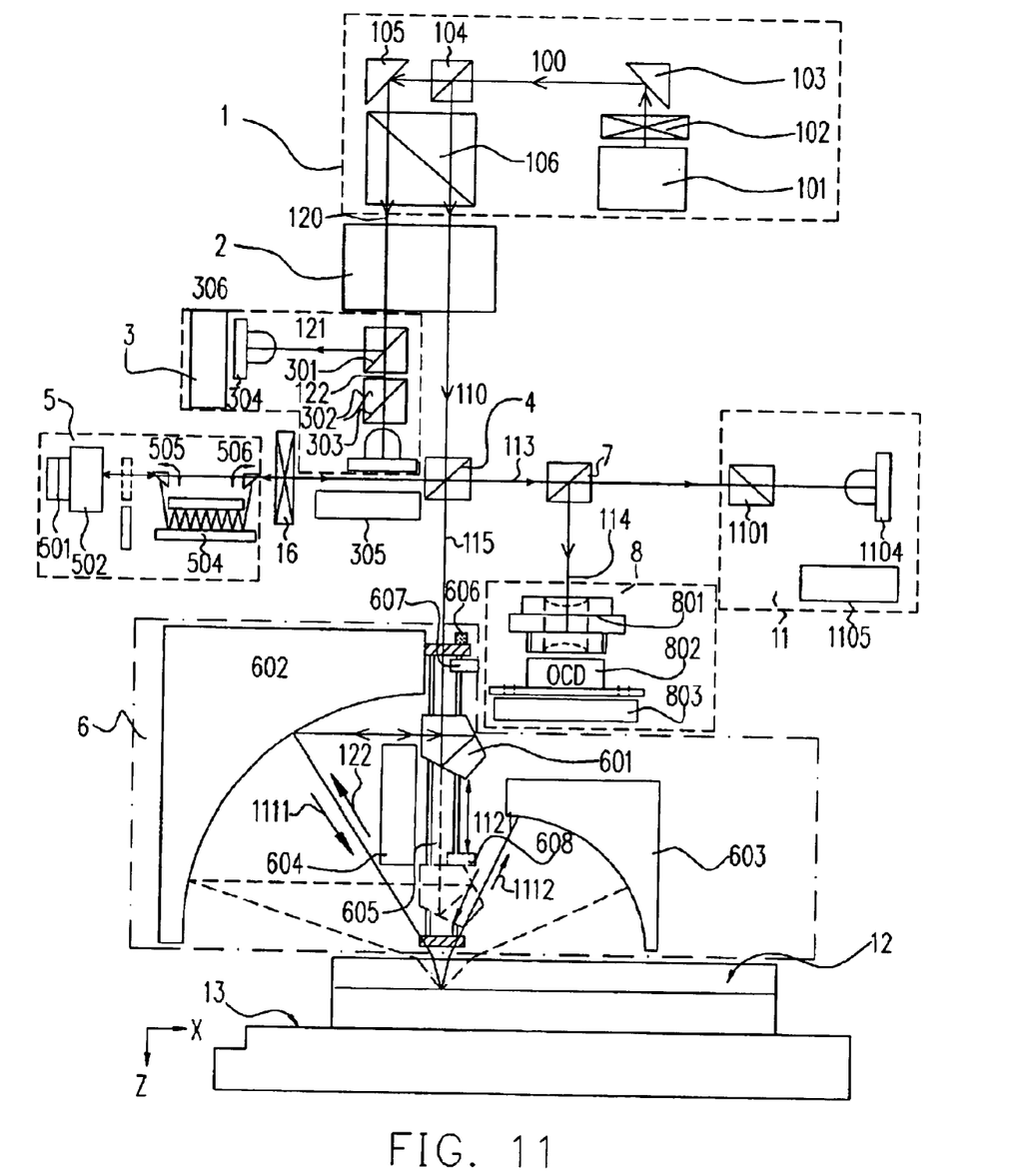
FIG. 11 schematically illustrates the system of FIG. 1 set up into a functional configuration for implementing phase detection under surface plasmon waves.

FIG. 11 schematically illustrates the system of FIG. 1 set up into a functional configuration for implementing phase detection under surface plasmon waves. For this functional setup, linear polarized light source 1, phase modulator 2, optical reference signal generator 3 and light path adjustment unit 5 are included in the detecting light source group, optical alignment control 6 and observe/control lens set 8 are in manipulation optics group, and scanning signal analysis unit 11 is in target signal processing group.

In this specific mode, the multi-function opto-electronic detection apparatus of the present invention is designed to perform as a surface plasmon resonator-based phase measurement apparatus. Upon the illumination by the sampling beam, a total reflection occurs at the interface between the substrate of the sample biochip and the coated metal film. As a result of the total reflection, a sampling beam on path 1112 is produced. Under this condition, incident angle of the sampling beam can be changed to trigger a surface plasmon wave at the interface between the substrate and its coated metal film. P-wave of the reflection beam on path 1112 undergoes a phase change. Amount of this phase change is related to the thickness and refractive index of the tested sample on the chip, and is also related with the size of the sample bio-molecules and their concentration.

While the above is a full description of the specific embodiments, various modifications, alternative constructions and equivalents may be used without departing from the spirit and scope of the invention. Therefore, the above description and illustrations should not be taken as limiting the scope of the present invention which is defined by the appended claims.

What is claimed is:

1. A multi-function opto-electronic detection apparatus for detecting molecular characteristics of a test sample comprising:

a detecting light source subsystem generating sampling beams for illuminating said test sample;

a manipulation optics subsystem aligning said sampling beam onto said test sample;

a target signal processing subsystem analyzing target beams emerging from said test sample resulting from said illuminating of said sampling beam; and a sample fixation subsystem holding said test sample; wherein said detecting light source subsystem, manipulation optics subsystem and target signal processing subsystem being assembled into an ellipsometer for detecting ellipsometric characteristics of said test sample.

2. A multi-function opto-electronic detection apparatus for detecting molecular characteristics of a test sample comprising:

a detecting light source subsystem generating sampling beams for illuminating said test sample;

a manipulation optics subsystem aligning said sampling beam onto said test sample;

a target signal processing subsystem analyzing target beams emerging from said test sample resulting from said illuminating of said sampling beam; and a sample fixation subsystem holding said test sample; wherein said detecting light source subsystem, manipulation optics subsystem and target signal processing subsystem being assembled into a confocal scanner for detecting an image of said test sample.

3. A multi-function opto-electronic detection apparatus for detecting molecular characteristics of a test sample comprising:

a detecting light source subsystem generating sampling beams for illuminating said test sample;

a manipulation optics subsystem aligning said sampling beam onto said test sample;

a target signal processing subsystem analyzing target beams emerging from said test sample resulting from said illuminating of said sampling beam; and a sample fixation subsystem holding said test sample; wherein said detecting light source subsystem, manipulation optics subsystem and target signal processing subsystem being assembled into a surface plasma resonance machine for detecting surface plasma resonance characteristics of said test sample.

4. A multi-function opto-electronic detection apparatus for detecting molecular characteristics of a test sample comprising:

a detecting light source subsystem generating sampling beams for illuminating said test sample;

a manipulation optics subsystem aligning said sampling beam onto said test sample;

a target signal processing subsystem analyzing target beams emerging from said test sample resulting from said illuminating of said sampling beam; and a sample fixation subsystem holding said test sample; wherein said detecting light source subsystem, manipulation optics subsystem and target signal processing subsystem being assembled into a photon tunneling scanning microscope for observing characteristics of said test sample.

5. A multi-function opto-electronic detection apparatus for detecting molecular characteristics of a test sample comprising:

a detecting light source subsystem generating sampling beams for illuminating said test sample;

a manipulation optics subsystem aligning said sampling beam onto said test sample;

a target signal processing subsystem analyzing target beams emerging from said test sample resulting from said illuminating of said sampling beam; and a sample fixation subsystem holding said test sample; wherein said detecting light source subsystem, manipulation optics subsystem and target signal processing subsystem being assembled into an interferometer for detecting phase interferometric characteristics of said test sample.

6. A multi-function opto-electronic detection apparatus for detecting molecular characteristics of a test sample comprising:

a detecting light source subsystem generating sampling beams for illuminating said test sample;

a manipulation optics subsystem aligning said sampling beam onto said test sample;

a target signal processing subsystem analyzing target beams emerging from said test sample resulting from said illuminating of said sampling beam; and a sample fixation subsystem holding said test sample; wherein said detecting light source subsystem, manipulation optics subsystem and target signal processing subsystem being assembled into an interferometer for detecting optical coherence tomographic characteristics of said test sample.

7. A multi-function opto-electronic detection apparatus for detecting molecular characteristics of a test sample comprising:

a detecting light source subsystem generating sampling beams for illuminating said test sample;

a manipulation optics subsystem aligning said sampling beam onto said test sample;

a target signal processing subsystem analyzing target beams emerging from said test sample resulting from said illuminating of said sampling beam; and a sample fixation subsystem holding said test sample; wherein said detecting light source subsystem, manipulation optics subsystem and target signal processing subsystem being assembled into a Doppler interferometer for detecting characteristics of said test sample.

8. A multi-function opto-electronic detection apparatus for detecting molecular characteristics of a test sample comprising:

a detecting light source subsystem, comprising a linear polarized light source, a phase modulator, an optical reference signal generator, and a light path adjustment unit;

a manipulation optics subsystem aligning said sampling beam onto said test sample and comprising an optical alignment control, and an observe and control lens set;

a target signal processing subsystem analyzing target beams emerging from said test sample resulting from said illuminating of said sampling beam and comprising an interferometric optical signal analysis unit and a scanning signal analysis unit; and a sample fixation subsystem holding said test sample and comprising a test sample support; wherein detecting light source subsystem, manipulation optics subsystem and target signal processing subsystem being assembled into one of a plurality of possible optical sampling setups in which said phase modulator modulating phase of a light beam generated by said linear polarized light source and directing a reference beam to said optical reference signal generator and a sampling beam to said optical alignment control; said optical alignment control aligning said sampling beam onto said test sample and generating a target signal beam therefrom and directing to said target signal processing subsystem; and said target signal processing subsystem analyzing said target signal beam for resolving said characteristics of said test sample.

9. A multi-function opto-electronic detection apparatus for detecting biomolecular characteristics of a test sample comprising:

a detecting light source subsystem, comprising a linear polarized light source, a phase modulator, an optical reference signal generator, and a light path adjustment unit;

a manipulation optics subsystem aligning said sampling beam onto said test sample and comprising an optical alignment control, and an observe and control lens set;

a target signal processing subsystem analyzing target beams emerging from said test sample resulting from said illuminating of said sampling beam and comprising an interferometric optical signal analysis unit and a scanning signal analysis unit; and a sample fixation subsystem holding said test sample and comprising a test sample support; wherein detecting light source subsystem, manipulation optics subsystem and target signal processing subsystem being assembled into one of a plurality of possible optical sampling setups in which said phase modulator modulating phase of a light beam generated by said linear polarized light source and directing a reference beam to said optical reference signal generator and a sampling beam to said optical alignment control; said optical alignment control aligning said sampling beam onto said test sample and generating a target signal beam therefrom and directing to said target signal processing subsystem; and said target signal processing subsystem analyzing said target signal beam for resolving said characteristics of said test sample.

10. A multi-function opto-electronic detection apparatus, which has the function to measure the complex index of reflection, film thickness and related bio-characteristics of the biochip by variable incident angle ellipsometry, and has the ability to measure bio reaction characteristics by surface plasma resonance, the apparatus comprising:

a linear-polarization light source, with an adjustable light intensity and initial polarization state in order to form a sampling light beam;

a phase modulation unit, for modulating a light phase, so as to a phase of the control the sampling light beam;

a reference-light analyzing unit, having a non-polarized splitter, an analyzing plate, and two optical sensors;

a variable-incident-angle optical member, having a lens with parabolic surface, a spherical reflection mirror and a shifting stage for loading a prism, so as to adjust an incident angle of the sampling light beam onto the biochip; and a signal detection and switching unit, for switching the incident angle for use in ellipsometric measurement or surface plasma resonance measurement.

11. The multi-function opto-electronic detection apparatus of claim 10, wherein the signal detection and switching unit includes an analyzing plate, an optical detector and a rotation member, so that the analyzing plate is rotated for having switching function.

12. The multi-function opto-electronic detection apparatus of claim 10, wherein the signal detection and switching unit includes an analyzing plate, an optical detector and a rotation member, so that the analyzing plate and the optical detector are rotated for having switching function.

13. The multi-function opto-electronic detection apparatus of claim 10, wherein the signal detection and switching unit includes an analyzing plate, an optical detector and a shifting member, so that the analyzing plate is shifted for having switching function.

14. The multi-function opto-electronic detection apparatus of claim 10, wherein the linear-polarization light source emits a coherence light beam.

15. The multi-function opto-electronic detection apparatus of claim 10, wherein the linear-polarization light source includes a laser diode and a linear polarizer.

16. The multi-function opto-electronic detection apparatus of claim 10, wherein the linear-polarization light source includes a light emitting diode and a linear polarizer.

17. The multi-function opto-electronic detection apparatus of claim 10, wherein the phase modulation unit includes a compensator, a liquid crystal phase modulator, or an optical elastic phase modulator.

18. The multi-function opto-electronic detection apparatus of claim 10, wherein the variable-incident-angle optical member comprises one selected from the group consisting of a reflection mirror, a triangular prism, and a penta prism.

19. The multi-function opto-electronic detection apparatus of claim 10, wherein the reference-light analyzing unit includes one selected from the group consisting of an optical diode and an optical charge coupled device.

20. The multi-function opto-electronic detection apparatus of claim 10, wherein signal detection and switching unit comprises an optical detector, the optical detector comprise one selected from the group consisting of an optical diode and an optical charge coupled device.

* * * * *